July 14, 1936.   H. HARDINGE ET AL   2,047,202
CLASSIFIER
Original Filed Dec. 22, 1932   9 Sheets-Sheet 3

INVENTORS
HARLOWE HARDINGE AND
ROBERT J. RUSSELL
BY
ATTORNEY

July 14, 1936.  H. HARDINGE ET AL  2,047,202
CLASSIFIER
Original Filed Dec. 22, 1932    9 Sheets—Sheet 4

INVENTORS
HARLOWE HARDINGE AND
ROBERT J. RUSSELL
BY
ATTORNEY

July 14, 1936.  H. HARDINGE ET AL  2,047,202
CLASSIFIER
Original Filed Dec. 22, 1932   9 Sheets-Sheet 5

INVENTORS
HARLOWE HARDINGE AND
ROBERT J. RUSSELL
BY
ATTORNEY

July 14, 1936.  H. HARDINGE ET AL  2,047,202
CLASSIFIER
Original Filed Dec. 22, 1932  9 Sheets-Sheet 7

INVENTORS
HARLOWE HARDINGE AND
ROBERT J. RUSSELL
BY
Malcolm N. Gannett
ATTORNEY

July 14, 1936.  H. HARDINGE ET AL  2,047,202
CLASSIFIER
Original Filed Dec. 22, 1932   9 Sheets-Sheet 8

INVENTORS
HARLOWE HARDINGE AND
ROBERT J. RUSSELL
BY
ATTORNEY

July 14, 1936.    H. HARDINGE ET AL    2,047,202
CLASSIFIER
Original Filed Dec. 22, 1932    9 Sheets-Sheet 9

INVENTORS
HARLOWE HARDINGE AND
ROBERT J. RUSSELL
BY
ATTORNEY

Patented July 14, 1936

2,047,202

UNITED STATES PATENT OFFICE 2,047,202

CLASSIFIER

Harlowe Hardinge and Robert J. Russell, York, Pa., assignors to Hardinge Company, Incorporated, York, Pa., a corporation of New York Application December 22, 1932, Serial No. 648,412
Renewed June 19, 1935

12 Claims. (Cl. 209—452)

This invention relates to apparatus of the type used for separating various kinds of materials, and more particularly to the type of apparatus used in the metallurgical and other industries for classifyng purposes. More specifically classifiers of the type falling within the scope of the present invention find use in almost every metallurgical operation where a mill grinds ores. The devices are also used for a great many industrial purposes and may be used to wash sands, and other minerals. The devices may also be used in connection with grinding mills where they act in the capacity of classifiers which pass on as a product material of a given fineness but which returns the oversize material for further grinding.

An object of the invention is to provide an improved classifier by which a close separation of materials may be obtained and in which the product is uniformly fine and the oversize is clean in that it contains a minimum amount of fines which should go out with the product.

Another object of the invention is to provide an improved classifier of the type in which the fineness and coarseness of the product discharged from the classifier depends upon the speed of rotation and the character of the material fed into the classifier, and in which means are included for changing the rotary speed to vary the product in accordance with variations in the character of the material, so that a uniform product can be obtained.

Another object of the invention is to provide an improved classifier in which the oversize material is adapted to be discharged from the main classifying chamber containing a plurality of buckets so connected with the main chamber that surplus water in the oversize material drains from the buckets back into the main chamber.

Another object of the invention is to provide an improved classifier in which the oversize material is adapted to be discharged from the classifier by means of buckets so constructed that water and fines picked up with the oversize material are discharged from the buckets in advance of the discharge of the oversize material therefrom.

Another object of the invention is to provide an improved classifier in which the ungraded material is delivered to a settling zone having a variable capacity.

Another object of the invention is to provide an improved classifier of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1:
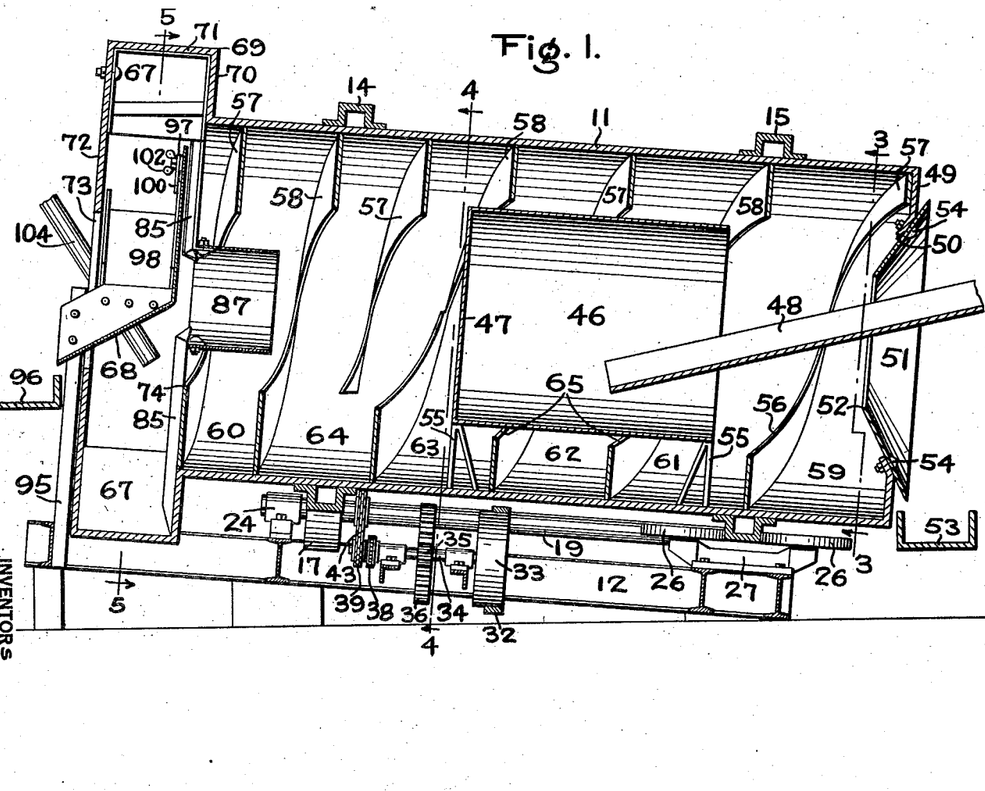
Figure 1 is a vertical longitudinal section of a classifier embodying the invention, showing the same without any material therein so as to clearly bring out the details of construction.
Figure 2:
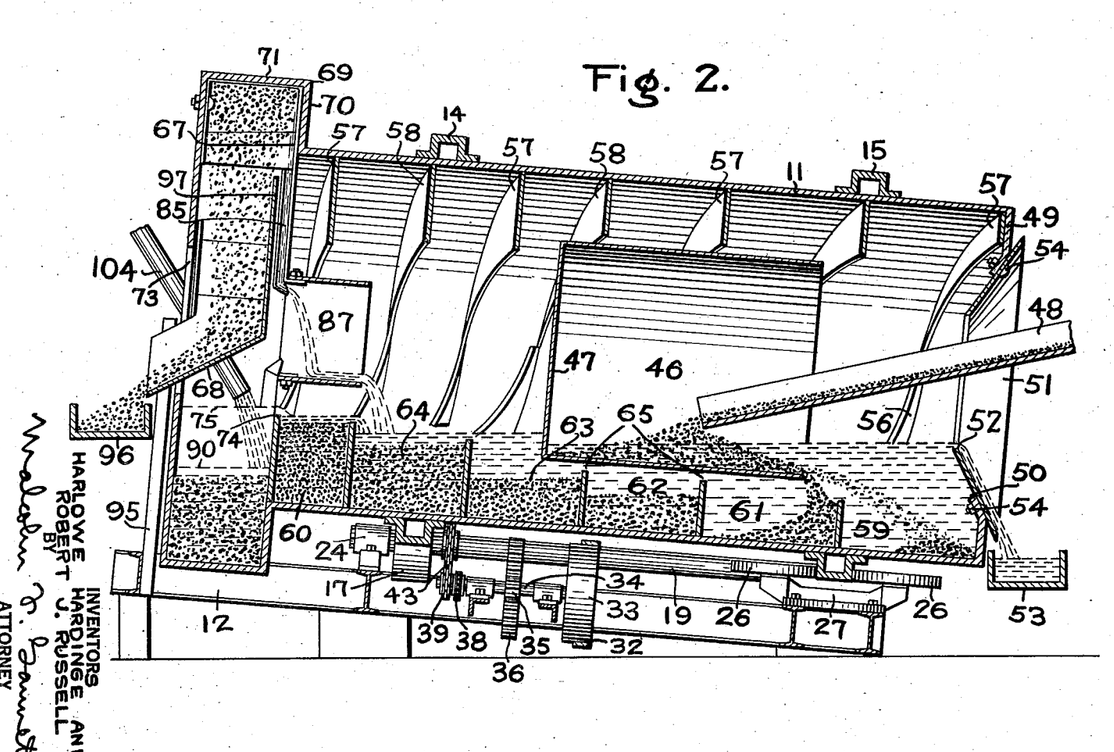
Figure 2 is a view similar to Figure 1, showing the manner in which the material passes through the apparatus.
Figure 20:
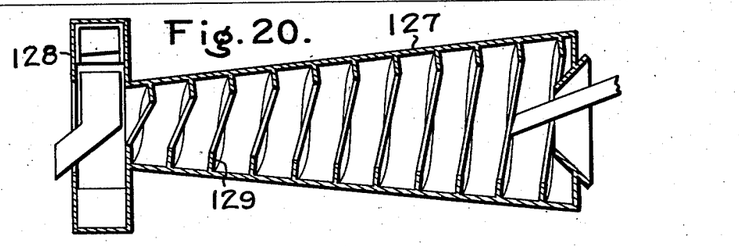
Figure 21:
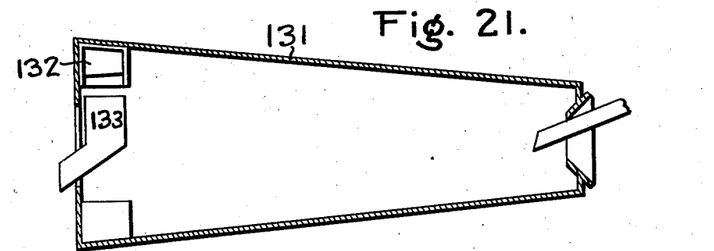
Figure 22:
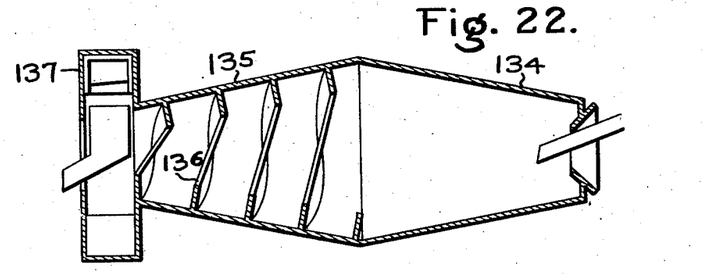

Referring to the drawings, the classifier comprises a main body portion or drum 11, which may be in the form of a cylinder, as shown in Figures 1 and 2, or the drum 11 may be constructed with any other desired configurations, such for instance as those shown in Figures 20, 21, and 22.

The drum 11 is adapted to be mounted for rotation with the axis of the drum inclined with respect to the horizontal, as shown in Figures 1 and 2, or if so desired the drum 11 may be so mounted that its axis is substantially horizontal. For most classes of work it is of advantage to set the classifier at an angle but it will be appreciated that when the nature of the material being classified so demands it, the apparatus should be horizontally disposed in order to obtain the best results. Therefore, while the drum 11 is illustrated in Figures 1 and 2 in an inclined position, it is to be understood that this is for illustrative purposes only, and that the classifier can be disposed in any other desired position.

The drum 11 is rotatably supported on a suitable base or frame 12 formed from I-beams and channels which may be welded and otherwise secured together to form a rigid structure.

Fastened to the exterior of the drum 11 and disposed adjacent each end thereof are annular tires 14, 15.

The tire 14 engages rollers 16, 17 on shafts 18, 19, respectively, and the tire 15 engages rollers 20, 21 on said shafts, respectively.

Figure 13:
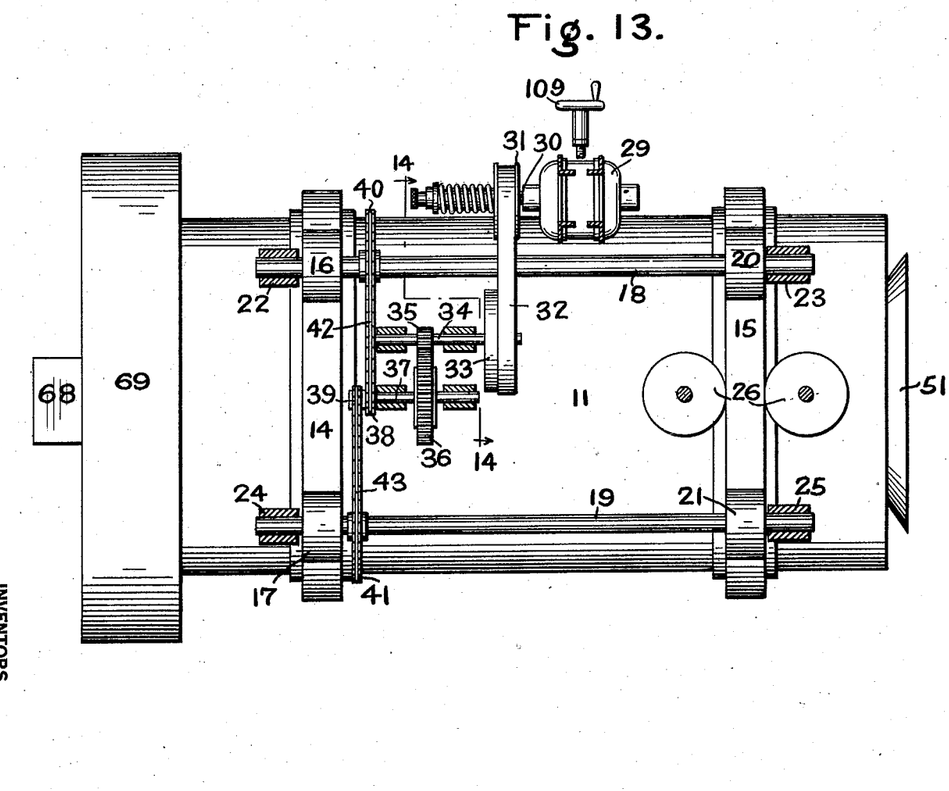
Figure 13 is an inverted plan, partly in section of the classifier, illustrating the driving mechanism.

The shafts 18 and 19 extend longitudinally of the classifier and are disposed on each side of the center line of the drum 11. As shown in Figures 1 and 13, the shafts 18 and 19 are journalled, respectively, in bearings 22, 23 and 24, 25, which are mounted on the frame 12.

For the purpose of preventing longitudinal movement of the drum 11 with respect to the frame 12, a pair of thrust rollers 26 are provided. The thrust rollers 26 are journalled in a bracket 27 carried by the frame 12, and said thrust rollers engage the opposite sides of the tire 15, as shown in Figures 1, 2, 3, and 13.

For the purpose of rotating the drum 11 any suitable mechanism may be utilized. In the present instance, we have shown the driving mechanism as including an electric motor 29, the shaft 30 of which is operatively connected through a pulley 31, belt 32 and a pulley 33 to a countershaft 34. The countershaft 34 carries a pinion 35 which is in meshing relationship with a gear 36 on a countershaft 37. Countershaft 37 carries sprockets 38 and 39 which are, respectively, operatively connected to sprockets 40 and 41 on shafts 18, 19, by chains 42, 43.

For convenience the left hand end of the drum 11, as illustrated in Figure 1, will be referred to as the front end and the right hand end of the drum 11 will be referred to as the rear end.

The right hand or rear end of the drum 11 is the end through which material to be classified is fed into the drum 11, and the left hand or front end is the end through which the oversize is discharged. As shown in the present embodiment of our invention the axis of the drum 11 is inclined upwardly from right to left.

The material is adapted to be delivered into the classifier by means of a chute or trough 48 which terminates at a suitable distance from the right hand or rear end of the drum.

During the operation of the classifier the material discharges from the trough 48 in a continuous stream which may have considerable velocity, and in order to prevent surging of the material towards the left hand or discharge end of the drum, means may be provided for intercepting the flow of incoming material and directing the same at a moderate rate into the primary settling zone of the drum 11 near the right hand or rear end thereof.

Therefore, when the nature of the material being classified is such that unsettled conditions will be caused by the descent of the incoming material into the material which is settling in the drum 11, an inner drum 46 may be disposed within the main drum 11 in such a position as to initially receive material discharged from the chute 48. Accordingly, we have, in the present instance, shown the inner drum 46 in Figures 1, 2, and 3 of the drawings. However, it will be understood that when so desired, the inner drum 46 can be omitted from the classifier without departing from the spirit of our present invention.

Figure 3:
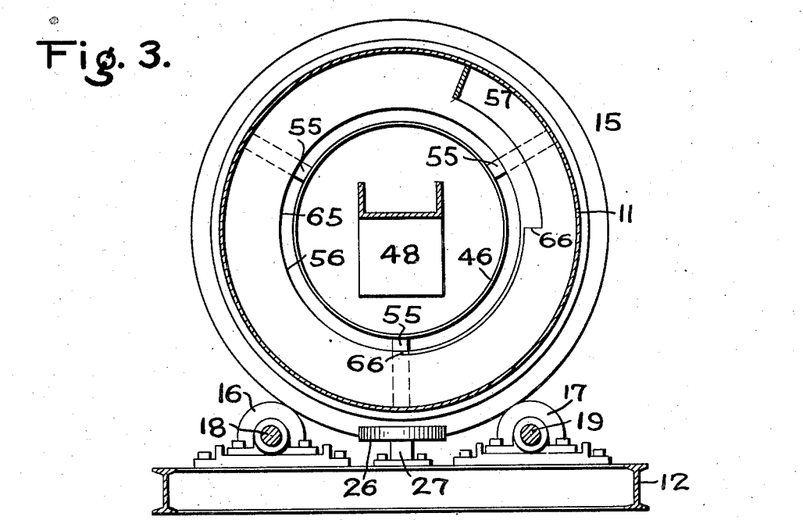
Figure 3 is a vertical transverse section taken on the line 3—3 of Figure 1.
Figure 4:
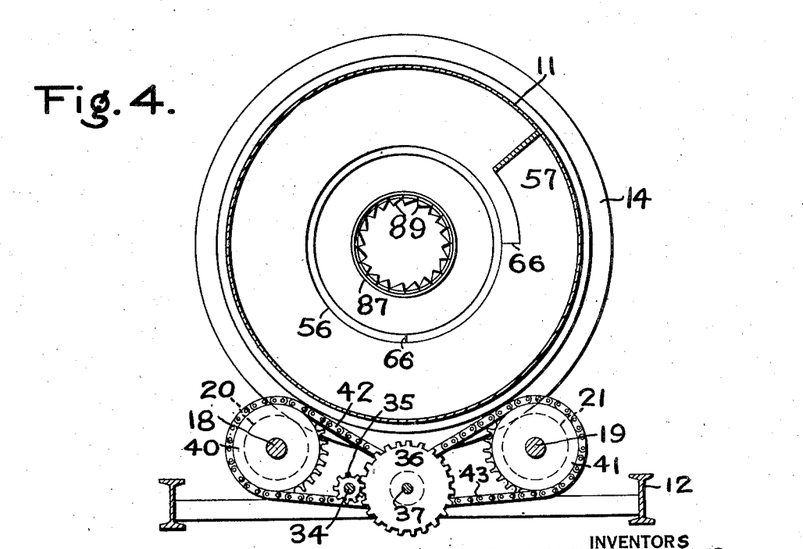
Figure 4 is a vertical transverse section taken on the line 4—4 of Figure 1.

The inner drum 46, which is arranged coaxially with respect to the main drum 11, is somewhat smaller in dimensions than the drum 11. The drum 46 preferably is formed with an inner end wall 47 which is closed, while the opposite, or outer end of the drum 46, is open for a purpose to be hereinafter described. The inner drum 46 is so disposed within the main drum 11 that the ends and sides of the inner drum are spaced a suitable distance from the walls of the drum 11, and as shown in Figures 1 and 3, the inner drum is held in spaced relation to the drum 11 by means of a plurality of stays or rods 55.

The right hand or rear end wall 49 of the main drum 11 is formed with an opening 50 which may be of sufficient area to permit the passage of the inner drum 46 inwardly and outwardly of the main drum 11.

Projecting into the opening 50 and fastened to the end wall 49, is a conical band 51. As shown in Figures 1 and 2, the side wall of the band 51 is formed at a considerable angle to the axis of the drum 11, the smaller end portion of the band being disposed within the drum 11 and the larger portion being disposed exterior of the rear end wall 49 of the drum 11.

The purpose of the band 51 is to provide an inlet opening for the classifier, and said band is so formed that the inner or smaller end thereof provides a lip 52 over which the fines and wash water are discharged from the classifier. The fines and wash water are then directed by the inclined wall of the band 51 toward a trough 53, as shown in Figure 2.

As shown in Figure 1, the band 51, which is preferably formed from sheet metal of suitable gauge, may be detachably secured to the end wall 49 of the drum 11 by means of bolts 54, so that when desired the band can be quickly and easily removed for alteration or replacement. In some instances the class of material being classified may be such that it is desirable to lower the depth of water in the drum 11. When this is the case, the inner end of the band 51 can be enlarged by cutting the material back on a line parallel with the front edge of the band, or if so desired the band 51 can be removed and another band substituted having a larger inner opening.

For the purpose of conveying material from the right hand or rear end of the drum 11 toward the left hand or front end thereof and also for turning the material over in the wash water within the drum 11, means in the form of a helical trough or screw flight 56 are provided.

As shown in Figure 1, the helical trough or screw flight 56 comprises metal bands 57, 58, which are arranged around the inner wall of the drum 11 in the form of a screw and which are coextensive with said drum. While two bands are illustrated in the present embodiment of the invention as comprising the helical trough, it will be understood that when so desired the helical trough or screw flight 56 can be formed by a single band, the convolutions of which are arranged in screw form around the inner wall of the drum 11.

The height of the metal bands 57, 58 varies from end to end, said bands being of considerably less height at the right hand or rear end of the drum 11, than at the left hand or front end of said drum, so that the helical trough will gradually increase in depth from the rear end toward the front end of the drum 11.

In order to provide for a squeezing action of the material passing through the drum 11, the pitch of the helical trough or screw flights 56, is varied from one end of the drum to the other. That is to say, the convolutions of the bands 57, 58 are so formed that the helical trough 56 is considerably narrower at the left hand or front end than at the right hand or rear end of the drum 11.

The construction and arrangement of the bands 57, 58 is such that a series of pockets or compartments are formed for containing the material, the compartment at the right hand or rear end of the drum 11 being comparatively broad in width and shallow in depth, as indicated at 59, Figure 1, and the compartment 60 at the left hand or front end of the drum 11 being comparatively narrow in width and high in depth, and also being less in cross sectional area than the compartment 59. The intermediate compartments 61, 62, 63 and 64, progressively change in cross sectional dimensions, as shown in Figures 1 and 2.

As illustrated in Figures 1, 2, and 3, the inner or upper edges of the portions of the bands 57, 58, which surround the inner drum 46 are spaced a suitable distance from the exterior of said inner drum, so as to provide a space 65, through which the wash water and the material in suspension therein can flow from the front end of the drum 11 toward the rear or right hand end thereof, as will be hereinafter more fully described. Thus, while the height of the bands 57, 58 remains substantially constant through the intermediate portion of the drum 11 which is occupied by the inner drum 46, the distances between the portions of the bands 57, 58 which define the compartments 61, 62, and 63, gradually decrease from right to left, so that the cross sectional areas of said compartments are progressively smaller toward the left hand or front end of the drum 11.

As shown in Figures 1, 2, 3, and 4, the bands 57, 58 contact with the inner wall of the drum 11, being made integral therewith, preferably by welding. These bands constitute a dam for preventing the passage of water and fines along the inner surface of the drum 11, since a water tight joint is formed between the edges of the bands and the inner wall of the drum.

If so desired, steps 66 can be formed in the bands 57, 58 where the height thereof is increased, as shown in Figures 1, 2, 3, and 4. By providing steps it is easier to shape the metal constituting the bands before said bands are installed in position within the drum 11.

Any suitable means may be utilized for removing the coarse material from the front end of the classifier. In the embodiment of the invention herein illustrated, the discharge means comprises a plurality of elevators or buckets 67 which are adapted to scoop up the material in the left hand or front end of the drum 11 and deposit the same into a discharge trough 68.

Figure 5:
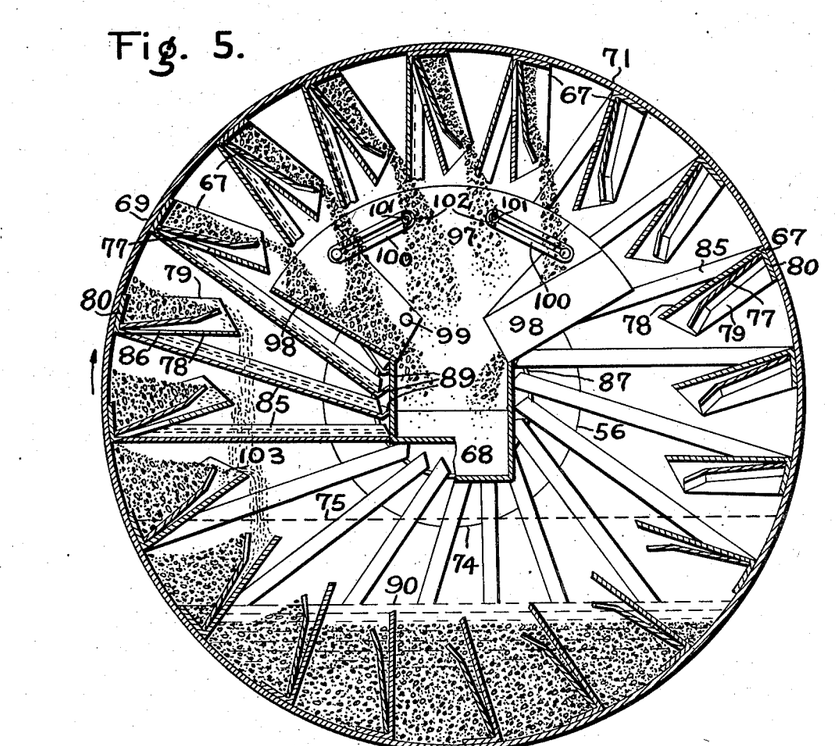
Figure 5 is an irregular vertical transverse section of the discharge end of the classifier taken approximately on the line 5—5 of Figure 1.
Figure 6:
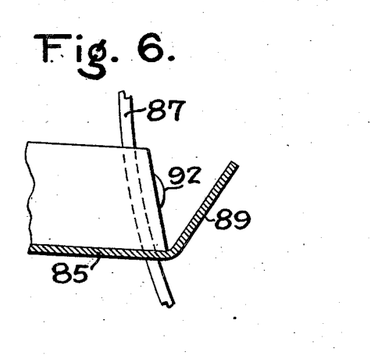
Figure 6 is an enlarged sectional view of the discharge end of one of the bucket troughs shown in Figure 5.

As shown in Figures 1, 2, and 5, the buckets 67 are disposed within an annular casing 69 having a diameter slightly larger than the diameter of the drum 11.

Figure 11:
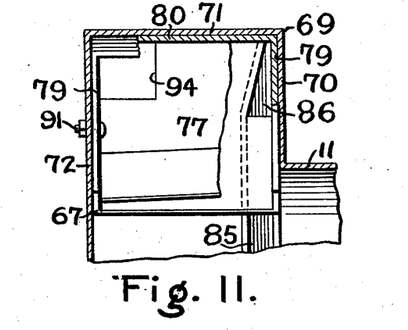
Figures 11 and 12 are sections illustrating a modified form of bucket.
Figure 12:
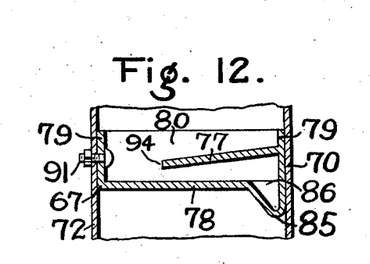

If so desired, the walls of the casing 69 can be formed as a continuation of the wall of the drum 11, said casing having a rear wall 70, which is welded or otherwise connected to the end of the wall of the drum. The casing 69 also has an annular side wall 71, and a front wall 72, (see also Figures 8 and 11). The front wall 72 has an opening 73 formed therein through which the discharge trough 68 projects.

The left hand or front end of the drum 11 opens directly into the casing 69. The helical trough 56 terminates adjacent to the junction of the drum 11 with the casing 69, so that the material, in moving forwardly through the drum 11, is caused to spill over the lip 74 provided by the last convolution of the helical trough and be deposited into the bottom of the casing 69 (see Figures 1 and 2).

The buckets 67 are so constructed that the material deposited in the bottom of the casing 69 is readily picked up and carried upwardly to a point above the level of the wash water in the classifier, means being provided by which the water quickly drains from the elevated material before such material is discharged from the buckets.

As shown in Figures 5, 8, 9, 10, 11, and 12, the buckets 67, which are preferably formed from sheet metal of suitable gauge, are U-shaped in cross section and have double bottoms 77, 78, that is to say, one bottom overlying the other, so as to provide a main bucket and a secondary bucket.

Figure 10:
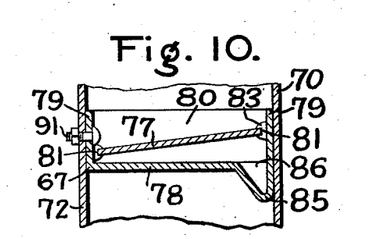
Figure 10 is a vertical transverse section taken on the line 10—10 of Figure 8.

The main body portion of each bucket is preferably formed from a blank of metal which is bent to provide side walls 79 and an end wall 80, said walls projecting upwardly from the bottom 78. The side walls 79 fit snugly between the walls 70 and 72 of the casing 69, as shown in Figure 10, and the end wall 80 is curved to conform with the curvature of the wall 71 of the casing 69, as shown in Figure 5. The joints between the walls 79 and 80 are closed by means of welding or in any other suitable manner.

Figure 9:
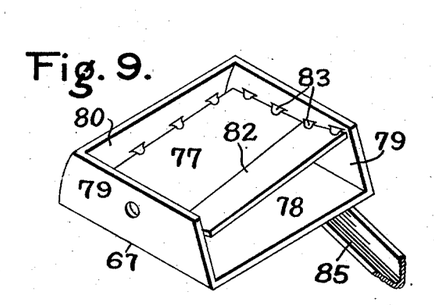
Figure 9 is a detail perspective of one of the buckets with a portion of the trough associated therewith.

The upper bottom 77 may comprise a plate with an area slightly less than the area of the bottom 78, so that a small space or gap 81 is formed between the edges of the upper bottom 77 and the walls 79 and 80. The purpose of the space or gap 81 is to permit the water present in the oversize material picked up by the buckets to quickly drain from the material when the buckets emerge from the water in the bottom of the casing 69, and in order to direct the surplus water to the rear of the buckets and also to prevent the material from spilling over the front or outer edges of the buckets while the water is settling out, the upper bottom 77 is disposed at an angle, both longitudinally and transversely with respect to the lower bottom 78, as shown in Figures 9 and 10, and the outer portion of the bottom 77 is bent upwardly, as indicated at 82, Figure 9.

Figure 8:
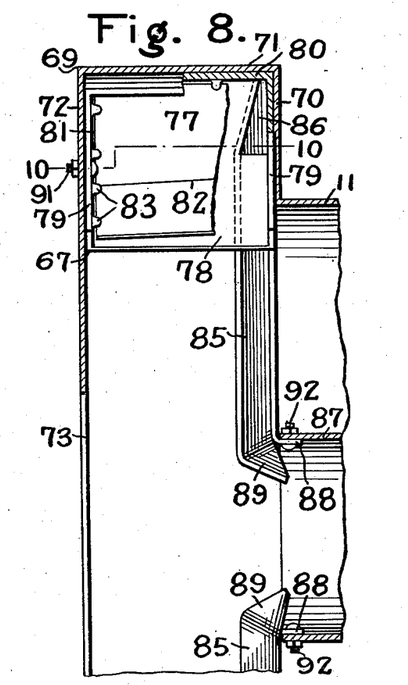
Figure 8 is an enlarged detail of a portion of the discharge end of the classifier showing one of the buckets and the trough associated therewith, a portion of the bucket being broken away to show the underlying structure.

The plate comprising the upper bottom 77 is secured to the walls 79 and 80 by spots of welding as indicated at 83. These spots of welding are suitably spaced apart, as shown in Figures 8, 9, and 10, so as to permit the free passage of water through the spaces 81.

As shown in Figure 5, the lower bottom 78 of each bucket extends outwardly a suitable distance beyond the up-bent portion 82 of the upper bottom 77, for the purpose of intercepting the overflow from the main portion of the buckets when the buckets move upwardly out of the material and wash water in the bottom of the casing 69, and this lower bottom portion 78 thus acts as a deflector during a portion of each revolution of the device, as will be hereinafter more fully described.

Associated with each bucket 67 is a V-shaped trough 85 (see Figures 1, 2, 5, 6, 7, 8, 9, and 10).

The buckets 67 are disposed in the casing 69 at a suitable angle, and the troughs 85 extend from the wall 71 or inner portions of the buckets toward the center of the classifier, said troughs being disposed at an angle with respect to the buckets for a purpose to be hereinafter described.

One corner of the bottom 78 of each bucket is formed with an opening 86, and the trough 85 extends inwardly from said opening to a cylinder 87 disposed at the left hand or front end of the drum 11 and arranged coaxial therewith (see Figures 1, 2, and 8).

Figure 7:
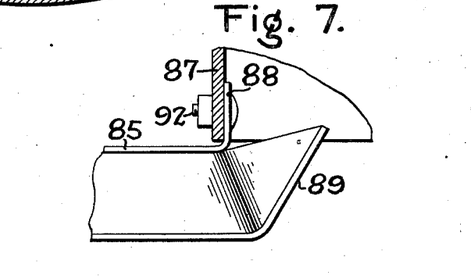
Figure 7 is a plan of the end of the trough shown in Figure 6, the cylinder associated therewith being shown in section.

Preferably the trough 85 is formed from sheet metal bent to the desired form. The outer end of the trough 85 is connected to the bottom of the bucket 67 by welding. At the inner end of each trough 85, the metal is slit, so as to form a tongue 88 which is bent at an angle to engage the inner surface of the cylinder 87, as shown in Figure 7. The inner end portion of the trough 85 is bent at an angle, as indicated at 89, Figures 6, 7, and 8, so as to provide a deflector for directing the water flowing down the trough 85 inwardly towards the right and into the end of the cylinder 87 disposed within the drum 11, as will be hereinafter more fully described.

The buckets 67 are detachably secured in position in the classifier by means of bolts 91 (Figures 8 and 10) which are passed through alined openings in the front wall 72 of the casing 69 and the outer side walls 79 of the buckets. Bolts 92 are used for securing the tongue 88 of each trough 85 to the cylinder 87.

In some instances, it may be desirable to provide for a freer communication from the upper to the lower portion of the buckets 67 than that provided by the spaces 81. When this is the case the buckets 67 can be made in the manner illustrated in Figures 11 and 12. As shown, the upper bottom 77 is adapted to fit snugly within the side walls of the bucket and a large opening 94 is formed in one corner of the bottom 77 through which the wash water can readily pass.

As shown in Figures 1, 2, and 5, the trough 68 comprises a main body portion which is supported by a standard 95 carried by the frame 12. The main body portion of the trough 68 is U-shaped in cross section, as shown in Figure 5, and slopes downwardly through the opening 73 so that the material being discharged from the front end of the classifier is directed toward a chute 96. At its upper end, the trough 68 is formed with a back 97 which extends upwardly towards the buckets 67. The trough 68 is stationary and its back 97 is spaced in front of the troughs 85 so that the troughs 85 will clear the back 97 during the operation of the classifier.

Associated with the trough 68, is a pair of adjustable wings 98 which are disposed on opposite sides of the trough 68. The wings 98 provide a wide mouth for receiving material discharged from the buckets 67 and directing the same toward the trough proper. The wings are pivotally connected to the back 97, as indicated at 99 (Figure 5) and in order to retain the wings in their adjusted positions, slotted links 100 are provided. Each link 100 is connected at one end to a wing 98, near the upper corner thereof. A bolt 101 carried by the back 97 extends through the slot in the link 100 and carries a wing nut 102 which is adapted to clamp the link to the back of the trough 68.

Projecting through the opening 73 in the outer end wall 72 of the casing 69, is a pipe 104 (Figures 1 and 2) through which wash water is supplied to the classifier.

In lieu of the cylindrical drum type of classifier shown in Figures 1 and 2, other forms of classifiers may be used, such for instance as those illustrated in Figures 19, 20, 21, and 22. In all of these various forms of drums, it will be noticed that the discharge ends are larger in diameter than the main body portions.

Figure 19:
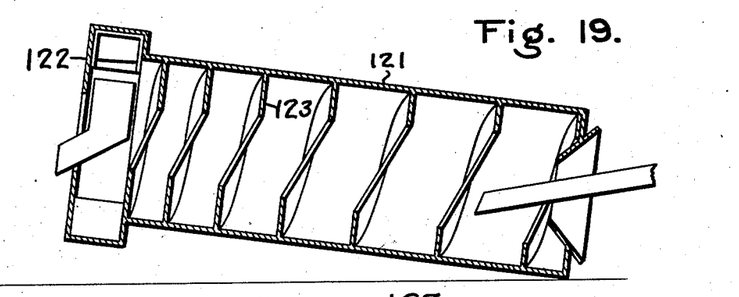
Figures 19, 20, 21, and 22 are diagrammatic longitudinal sections of various forms of drums which may be employed with classifiers embodying our invention.

In the form of the invention shown in Figure 19, the inner cylinder 46 is omitted from the drum 121. In other respects, however, the construction is similar to that previously described in connection with the preferred form of the invention. By constructing the drum 121 with an enlarged end casing 122, an enlarged discharge zone is provided. This enlarged discharge zone assists the free flow of the oversize material carried through the drum by the helical trough 123.

The form of classifier shown in Figure 20 comprises a conical drum 127 having its side wall inclined inwardly toward the oversize discharge end. At the smaller or oversize discharge end, the drum 127 is formed with an enlarged casing 128. The drum 127 is provided with a helical trough 129 which may be substantially similar to the helical trough previously described. A classifier of this type has a larger settling zone for fines, but a restricted zone for oversize. This is desirable for classifying some grades of material, since the enlarged discharge zone provided by the casing 128 has such a large capacity as to prevent the oversize material from choking back into the drum.

In the modification of the classifier illustrated in Figure 21 the drum 131 is conical and is tapered in a direction opposite to the taper of the drum 127 illustrated in Figure 20. The discharge buckets 132 are arranged around the enlarged oversize discharge end. The oversize material settling out and resting on the bottom of the drum 131 tends to travel to the left and is picked up by the buckets 132 and delivered to the discharge chute 133 in the manner heretofore described.

A combination form of drum is shown in Figure 22, wherein the drum is composed of oppositely tapered conical sections 134, 135, each of which taper toward the ends of the drum. In this form of the invention only the section 135 is provided with a helical trough 136. The end of the section 135 is formed with an annular casing 137 which is similar in form and function to the casings heretofore described.

As shown in Figures 19 to 22 inclusive, the modified forms of classifiers are each provided with a chute at one end similar to the chute 48 heretofore described, through which the material is delivered to the drum, and a chute at the opposite end similar to the discharge chute 68, and in the enlarged casings at the discharge end of the classifiers shown in Figures 19, 20, and 22, there are buckets similar to the buckets 67.

The effect of speed on a classifier of the type herein shown and described is of vital importance, not so much in the desire to vary the speed from one moment to the next, but the ability to operate the classifier at the speed most suitable for any given condition.

As will be hereinafter more fully described, we illustrate one form of means for changing the speed of rotation of the classifier, said speed changing means comprising a variable speed transmission operatively associated with the electric motor 29 heretofore referred to, and while we have shown one form of mechanism for changing the speed of the classifier it will be understood that other known types of speed changing devices can also be used without departing from the spirit of our invention.

Figure 14:
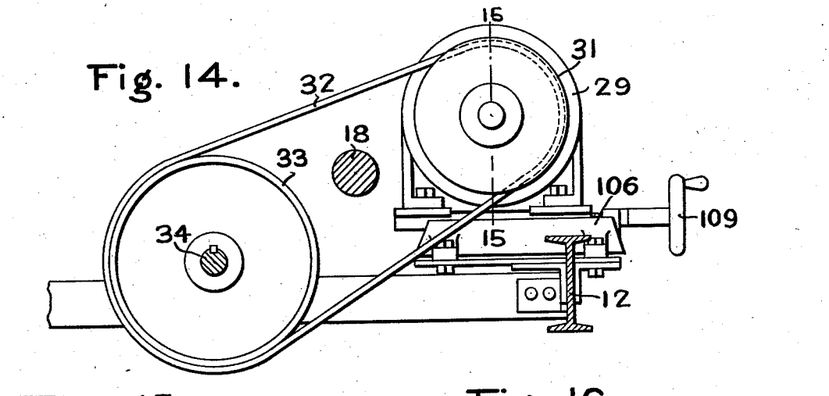
Figure 14 is a vertical transverse section taken on the line 14—14 of Figure 13.
Figure 17:
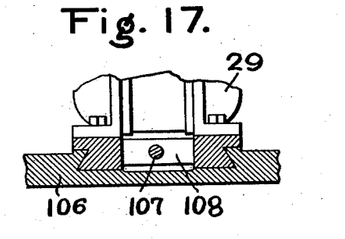
Figures 17 and 18 are sections of the mechanism for adjusting the position of the driving motor.
Figure 18:
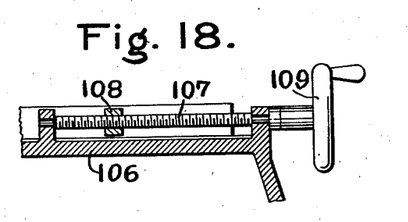

As shown in Figures 14 and 17, the motor 29 is slidably mounted on a base 106 fixed to the frame 12, so that said motor can be moved toward or away from the longitudinal axis of the drum 11 to loosen or tighten the belt 32.

The operating means for shifting the position of the motor 29, comprises a threaded shaft or rod 107 which is journalled in the base 106. The shaft 107 operatively engages a threaded lug or boss 108 attached to the bottom of the motor 29, as shown in Figure 17.

The outer end of the shaft or rod 107 is provided with a crank or hand wheel 109, so that said shaft can be manually operated. Rotation of the crank or hand wheel 109 in either direction, that is to say, either clockwise or counter clockwise, will cause, through the action of the shaft 107 and lug 108, an inward or outward shifting movement of the motor 29, depending upon the direction in which the crank or hand wheel is turned.

Figure 15:
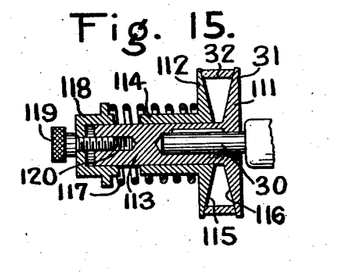
Figure 15 is a vertical section taken on the line 15—15 of Figure 14, showing the adjustable pulley in one position.
Figure 16:
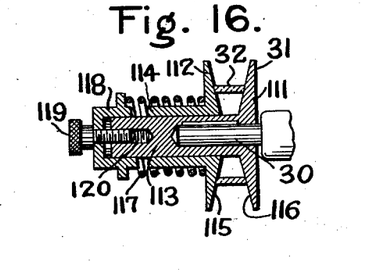
Figure 16 is a view similar to Figure 15, showing the pulley in another position.

As shown in Figures 15 and 16, the pulley 31 is composed of two sections 111, 112.

The pulley section 111 is formed with an elongated hub 113 which is keyed or otherwise secured to the motor shaft 30.

The pulley section 112 is formed with a tubular hub 114 which is slidably mounted on the hub 113, so that the section 112 can move toward or away from the fixed section 111 for a purpose to be hereinafter described.

The portions of the pulley sections 111, 112 which face each other are inclined to provide conical faces 115, 116, respectively. The inclined faces 115, 116 extend inwardly toward each other, so that, in cross section, a shown in Figure 15, a wedge shaped gap is formed between the two sections.

The belt 32 is of sufficient width to span the gap between the sections 111, 112 of the pulley 31, so that the edges of said belt will engage the inclined faces 115, 116, irrespective of the relative positions of said sections.

When the sections 111, 112 are positioned comparatively close together, as shown in Figure 15, the edges of the belt will engage the faces 115, 116, adjacent the periphery of the pulley, and when the sections 111, 112 are spaced farther apart, as shown in Figure 16, the edges of the belt 32 will slip down the inclined faces 115, 116 and engage the portion of the pulley adjacent the hub 52. It will thus be noted that the construction is such that a pulley of variable diameter is provided.

The section 112 of the pulley 31 is urged toward the fixed section 111 by an expansible coil spring 117, which encircles the hubs 113 and 114, and bears at one end against a cap 118 carried by the outer end of the hub 13, and at the other end against the outer face of the section 112.

The cap 118 is retained in position by means of a thumb screw 119 which is threaded into an opening or bore 120 in the end of the hub 113. By turning the thumb screw 119, the tension of the spring 117 can be adjusted.

The force of the spring 117 is sufficient to prevent a shifting movement of the movable section 112 away from the fixed section 111 after the motor 29 has been set in the desired position.

When the motor 29 is moved inwardly toward the longitudinal center line of the drum 11 and the tension of the belt 32 is thus slackened, the spring 117 will urge the movable section 112 toward the fixed section 111 so that the faces 114, 115 will continue to frictionally engage the edges of the belt 32.

When the motor 29 is moved outwardly away from the longitudinal center line of the drum 11, thereby tightening the tension of the belt 32, the spring 117 will be compressed, since the frictional engagement of the edges of the belt will force the movable section 112 away from the fixed section 111 against the force of the spring 117.

By thus varying the diameter of the pulley 31 the ratio of said pulley with the pulley 33 will be likewise varied, so as to effect corresponding changes in the speed of the shaft 34, and hence changes in speeds of the shafts 18 and 19, so that the rollers 16, 17, 20, and 21 are rotated either faster or slower and the drum 11 consequently will be rotated faster or slower.

In operation, assuming that the classifier is charged with material and water, as shown in Figure 2, and the drum 11 is being rotated through the operation of the motor 29 and the driving mechanism associated therewith, each of the compartments 59, 61, 62, 63, 64, and 60, between the screw flight or helical trough 56, will contain varying quantities of material and a corresponding amount of material will be in the discharge end of the classifier defined by the casing 69.

The water line of the classifier is normally above the lip 52, heretofore referred to, and since it is customary to have the classifier in a slightly tilted position with the rear end lower than the front end, the direction of flow of water will be towards the rear end even though no extra wash water is introduced into the classifier through the pipe 104.

The rear end portion of the classifier as defined by the compartments 59, 61 heretofore referred to, functions as a primary settling chamber. During the operation of the device the coarse or oversize material will settle in the bottom of the drum 11, and the finer and other material which may have a tendency to float or is carried in suspension in the water will be carried out of the classifier by the water which passes over the lip 52.

The oversize material which settles in the bottom of the drum is forced, through the action of the helical trough or screwflight 56, toward the left hand or discharge end of the drum 11, the material being constantly turned over by the rotation of the drum and the action of the helical trough.

In its forward movement through the drum 11, the oversize material comes in contact with cleaner and cleaner wash water, and as the material turns over, the finer particles which are disposed between the coarser particles are liberated, and the wash water carries these particles of fines with it toward the overflow end of the classifier. In this way the water passing from the front end of the classifier toward the rear end washes the coarse particles clean of fines, dirt, slime, etc.

Since the wash water travels from left to right between and above the helical trough or screw flights 56, it will be understood that the speed of rotation of the classifier is a factor determining the rate of travel of the coarser particles from the right end of the classifier to the left end and consequently is a factor in determining the degree of washing produced by the counter current of water.

Due to the construction and arrangement of the parts comprising the helical trough or screw flight 56, the depth of material contained in the successive compartments between the convolutions of the helical trough varies from right to left as has heretofore been described, so that, as the material moves toward the discharge end of the classifier a squeezing action is gradually imparted to the material and the oversize material is condensed or compacted. This condensing of the oversize material is effected by the elimination of the finer material by the washing action and overflow over the top of the helical trough as the cross section of said trough becomes smaller toward the discharge end of the apparatus.

As illustrated in Figure 2, the purpose in so constructing the helical trough 56 is to build up the successive masses of material, so that when the material enters the last zone, as defined by the compartment 60, the proportion of wash water therein is considerably less than that in the rear or feed end of the classifier.

Figure 27:
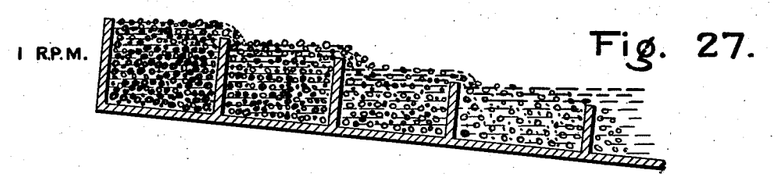
Figures 27, 28, and 29 are diagrammatic longitudinal views illustrating the material within the helical trough under various conditions.
Figure 28:
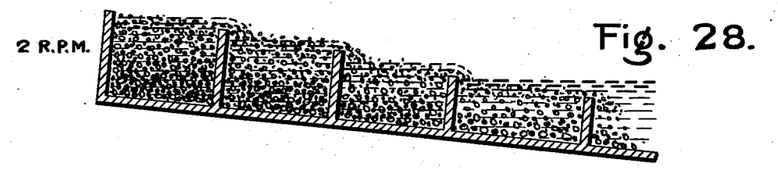
Figure 29:
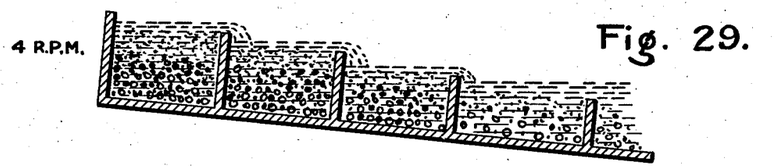

Another advantage resulting from constructing the helical trough 56 in such a manner is that the wash water, in flowing from left to right through the drum 11, is caused to pass from one compartment to the next in a series of cascades, as indicated at the left, Figure 2, and in so doing the wash water carries with it the finer material which is disposed on top of the condensed oversize material in the several compartments (see also Figures 27, 28, and 29).

As shown, the height of the band 58 between compartments 60 and 64 is above the level of the water in the classifier, so that wash water flowing from compartment 60 is caused to fall in the form of a cascade into compartment 64. Furthermore, the height of the band 58 separating compartment 64 from compartment 63 is considerably higher than the height of the band 57 which separates compartments 63 and 62. Therefore, should the depth of the water in the drum 11 be lowered to a point below the upper end of the band 58 separating compartments 64 and 63, a second cascade will be provided. Since the height of the helical trough becomes gradually lower towards the rear end of the classifier, when the level of the water in the drum 11 is further lowered, additional cascades will be formed. Also, should the discharge or left hand end of the classifier be elevated to a position higher than that illustrated in the drawings, this cascading effect can be produced without decreasing the amount of wash water admitted to the classifier, since the rear or right hand end of the drum 11 will be so much lower than the left hand or discharge end of the drum, that the level of the water in the drum will not extend as far toward the left as illustrated in Figure 2, with the result that additional portions of the bands comprising the helical trough 56 will project above the water.

Since the screwflight or helical trough 56 terminates at the junction of the drum 11 with the casing 69, the material will be discharged from the compartment 60 into the bottom of the casing 69 and fall into the buckets 67. The buckets then carry the material upwardly in the direction of the arrow, Figure 5, and deposit the same into the discharge trough 68.

Referring to Figures 2 and 5, the broken line 75 indicates the maximum height of water and material adapted to be contained in the discharge end of the classifier.

Under normal operating conditions the height of water and material will be that indicated by the broken line 90, however, when the classifier is operated at a greater capacity than that indicated, then the height of material in the discharge end of the classifier will be increased until the wash water is above the lowermost point of the edge of the screw flight 56.

The buckets 67 are so formed that water is permitted to drain therefrom. The rotation of the classifier is such that, as the buckets emerge from the water, the material will rapidly settle in the bottom of the buckets, causing the dirty water and the remainder of the fines to come to the surface. As rotation is continued, the dirty water and fines will decant off the top and drop into the secondary bucket immediately below the main bucket, as indicated at 103, Figure 5. The secondary bucket will deflect the fines and water back into the bottom of the bucket compartment without dropping into the incoming buckets and from thence the water and fines will flow through the troughs 85 to the cylinder 87. From the cylinder 87 the water and fines will discharge into the drum 11, as indicated by the broken lines Figure 2.

As rotation of the classifier continues the oversize will fall off of the buckets 67 and will drop into the chute 68 as shown in Figure 5.

In some cases the material passing through the classifier may be comparatively coarse so that when the buckets emerge from the water the material acts somewhat like a filter bed which permits water to percolate through. When this is the case, as the buckets emerge from the water, the oversize quickly settles and the water drains off, being carried by the troughs 85 to the cylinder 87 from which it is discharged into the drum 11.

From the foregoing it will readily be seen that under certain conditions there is an appreciable time element which is required for permitting proper settling of the oversize in the buckets and for effecting proper de-watering after each bucket has been elevated above the water line. Therefore, should the oversize be discharged too rapidly the speed of the apparatus can be slowed down by changing the speed of the driving mechanism. On the other hand, by speeding up the classifier, the material conveying capacity is increased, so that the material is drawn away from the settling zone at the right end of the drum 11, and unless the speed is too fast, will increase the fineness of the product being discharged at the front end, since the settling zone is being relieved of solids, which will increase the settling rate.

By varying the amount of wash water, the fineness, as well as efficiency, will also be affected. Increasing the wash water increases the dilution which increases the settling rate and also the fineness. With a decrease in water, the opposite will occur.

The effect of speed under various conditions and the necessity for operating the classifier at a proper speed in order to obtain the best results is very important.

For instance, let us assume that the classifier is in the form of an ordinary drum without a screw flight or helical trough.

Figure 24:
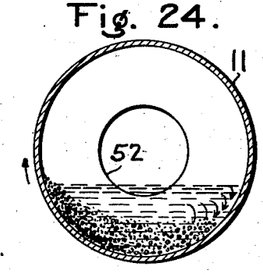
Figures 24, 25, and 26 are diagrammatic transverse views illustrating the appearance of the material within the classifier under various ranges of speed.

When the classifier is operated at slow speeds, which, for such materials as ordinary limestone or silica sand, would be approximately three revolutions per minute, the appearance of the mass and liquid within the classifier resembles that shown in Figure 24. It will be noted that the coarser sands are at the bottom and on the rising side of the drum 11 and that there is a very slight tendency of a circulating effect within the drum near the point of contact against the wall thereof. This tendency is not marked and is practically non-existent toward the central overflow point as defined by the lip 52. Hence any material and liquid in the drum 11 is not agitated to an extent which would appreciably affect the whole mass throughout the classifier.

Figure 25:
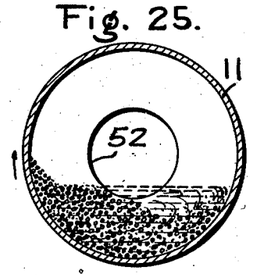

When the classifier is speeded up appreciably, conditions change. This is illustrated in Figure 25, where it will be noted that there is a much greater circulating effect throughout the classifier, and there is actually a tendency of crossflow over the top of the mass of material and water, owing to the fact that during revoluiton the material is drawn down on one side and raised up on the other side to an extent which will cause a circulating movement throughout the mass of material. However, assuming that there is enough liquid in the drum 11 to create a rather dilute pulp or mass, the coarser particles will have settled out below the overflow opening 52 before such particles get to said opening, even though the current is quite rapid from the outside periphery toward the center and out over to the other side, as indicated. It will be seen here that as the speed increases, this circulating effect also increases and there will be a greater tendency for the coarser particles to pass across the overflow opening 52 and flow out.

Figure 26:
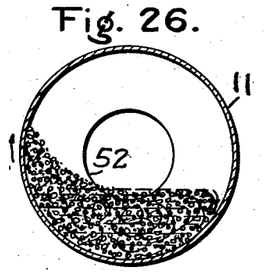

At high speeds, as shown in Figure 26, the rotation is so rapid that the whole mass acts almost as a unit and none but the very coarsest pieces will tend to settle out at all, and even the coarsest pieces, if the pulp is not very thin, will float out of the overflow opening 52.

Now assuming that we have a spiral in the classifier, not necessarily of the squeeze spiral type as is the helical trough 56, but an ordinary spiral, in order to remove the oversize or sands as they settle on the bottom of the classifier, another condition exists.

Again referring to Figure 24, it will be noted that as the sands settle and the classifier is rotated, the spiral will remove these sands away from the rear end or fines discharge end of the classifier and toward the front end or coarse discharge section. If the classifier is operated very slowly, and the spirals still are able to take care of the mass being settled out, the actual settling volume will be somewhat less than if the classifier is at a higher speed and the mass drawn away faster, which would mean more settling volume. Therefore, within this range of speed, an increase in speed will cause an increase in settling volume which will increase the settling rate and consequently increase the fineness of the overflow. This condition will continue until the speed becomes sufficiently high to cause the action previously described, and illustrated in Figure 25, at which time a further increase in speed will actually cause a decrease in fineness and will so continue with further increases in speed.

In any chamber containing a liquid and solid particles of different masses or sizes and of greater density than the liquid, the solid particles will settle out at various rates, depending upon the size and weight of the particles, counter forces opposing the settling, and ratio of solids to liquid. The density of the pulp (solids to liquid ratio) increases from the surface of the settling chamber to the bottom. The settling rate being a function of the pulp density, decreases as the particles settle from the surface. Removing dense pulp from the bottom of the settling chamber increases the settling rate in the settling zones above. It is in this manner that the fineness of overflow is improved by an increase in the effective settling pond, resulting from decreased pulp densities at various depths in the settling zone, all of which is caused by the increased solids removed by the screw flight or helical trough spirals with an increased speed.

Figure 23:
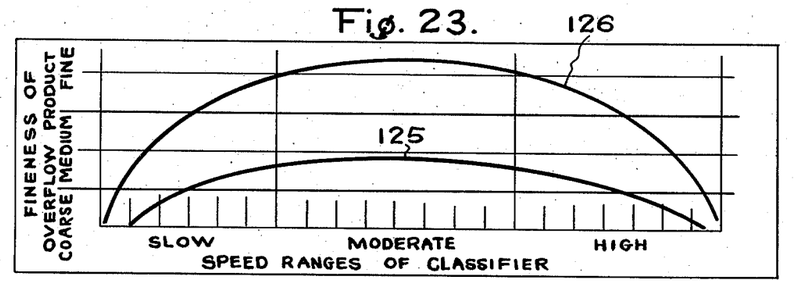
Figure 23 is a diagram illustrating the effect of a change in speed upon the fineness of the overflow product of a classifier constructed according to our invention.

The effect of changing the classifier speed on the classifier overflow is graphically illustrated by Figure 23.

The conditions illustrated in Figure 23 are further enhanced if the helical trough or spiral is utilized, which is illustrated in Figures 27, 28, and 29.

At a low speed the capacity of the spiral is limited, and if the speed of the classifier is too slow, part of the sands will overflow or will be forced over the trough and will spill back into the settling zone of the classifier near the overflow point. This action gradually decreases the settling volume, and as a result the overflow will contain more oversize particles.

When the speed of the classifier is increased slightly, the helical trough or spiral has a greater capacity, but with such an increase in speed the capacity is still not quite sufficient to remove all of the oversize particles. In this event the spiral removes all of the very coarse particles, but the finer of the coarse particles will still decant over the end section of the spiral and will tend to go back to the settling zone. In this case, while the effective settling volume will be increased somewhat, it is still insufficient to prevent the finer of the oversize particles from overflowing with the fines.

When the speed is increased sufficiently so that all of the coarser material is removed and does not decant over the last sections of the spiral, a further increase in speed will have but very slight effect upon the settling zone of the classifier and therefore slight effect upon the fineness until the speed becomes excessive, all of which is illustrated in Figure 23. As shown in said figure, curve 125 illustrates the effect without the spiral and curve 126 the effect with the spiral.

The foregoing explanation of the effect of the speed, etc. upon the product obtained with the classifier, is based upon the assumption that there is enough liquid in the classifier to cause free settling of the solids. If the liquid is decreased, the pulp density is increased and the settling rate is decreased, which means for a given condition, a coarser overflow will be produced, and an effect somewhat similar to that produced by a change in speed can be obtained by increasing or decreasing the wash water or dilution of water. The results, however, are limited and it has been found best to be able to change the speed, as well as the amount of wash water, in order to obtain the best combination or results.

From the foregoing it will be noted that there is a distinct range, wherein, for fine classification, a series of slow speed is desired, and that for a medium speed range, increase or decrease in speed makes very little difference, except as to the conveying capacity of the helical trough or spiral that may be in the drum, but does not have an effect upon the settling or classifying rate in the settling zone of the classifier itself.

With the higher or faster speeds a pronounced agitating effect is produced and there is not a sufficient time element for the material to settle out before the material gets to the overflow point, as previously described and illustrated by Figures 24, 25, and 26, and as a consequence only coarse overflows can be obtained. Here, of course, increasing the dilution will help, although there is a time when so much water could be employed and the velocity through the classifier would be so great that an increase in wash water would actually decrease the fineness, as there would be insufficient time to permit settlement.

The settling of solids in pulp is never absolutely uniform, and in older to eliminate oversize in the overflow, it is necessary that many fines be removed from the settling zone near the overflow, along with the oversize. For a given spiral capacity at a given speed, these fines would be conveyed to the sands discharge end, assuming the spirals remained loaded to the same point. Decrease in the carrying capacity of the spirals approaching the oversize discharge end permits cascading back toward the overflow of these fines for a constant classifier speed. Then to produce an oversize free of fines, it is necessary that these fines be returned to the overflow.

Thus, it will be noted that a variable speed will make it possible to give an overflow free of large particles, but some other means must also be correlated with this variable speed to eliminate these small particles from the oversize discharge end. If the feed volume and analysis were known and were invariable, a constant speed could be maintained all of the time for a given design of spiral. Since this is not possible, to produce continuous, good performance, it is necessary that these two classifier functions should be correlated during operation, which is done by adjusting the classifying speed.

It will be seen in the foregoing that a change in speed, particularly in the low range, will produce a pronounced effect upon the fineness, which is highly desirable in order to control the fineness within the limits desired in any one case. The operation is not only one of producing a fine product but of producing as little fines in the oversize as possible and as little oversize in the fines as possible. In order to produce as little fines in the oversize as possible, it is desired to obtain a certain amount of washing back of the fine oversize through the application of the helical trough or spiral and necessitates the decanting of a certain amount of these fines or very fine oversize back to the settling zone. On the other hand, if the settling zone is decreased too much with an insufficient carrying capacity of spirals or other discharge means, the overflow will contain too much coarse material. It will therefore be noted that the exact speed at which the classifier is to be operated varies with the character of the material, dilution in the classifier, and settling volume. It is very difficult to determine before an installation is made the exact speed which will prove to be best. Therefore, it is desirable to be able to change the speed of the classifier to meet mill conditions, and such a change should be made quickly, but not necessarily, while the classifier is in motion. Operating conditions often change materially from day to day, and in some cases from hour to hour, in which case it is highly desirable to have means for easily effecting a change in classifier speed.

An entirely different effect in the classifier is produced at the sand discharge end, where the buckets 67 discharge the sands or oversize from the classifier. At relatively high speeds the buckets 67 have a greater capacity, but inasmuch as the time element is relatively small between the time when the buckets remove the oversize from the liquid at the bottom of the casing 69 and the point of discharge into the discharge trough 68, as compared to the longer time element at a decreased speed, it would mean less chance for draining off the liquid and less chance for dewatering. Therefore, in certain cases where the settling end of the classifier is functioning properly within certain speed limits, a change in speed to effect a difference in moisture content of the discharge or actual capacity of discharge is of importance, and it is of advantage to provide means for enabling the speed of the classifier to be changed to suit this condition, even without consideration of the effect upon the settling volume, as described above.

The above description is based upon the hypothesis that the feed to the classifier is both constant in quantity and in fineness. As a matter of fact, practically every operation in the field is such that the quantity will vary or the fineness will vary, or both.

It can readily be seen that if the quantity of feed changes, let us say, the feed quantity increases, the result is that more solids accumulate in the settling zone, and more sands accumulate in the spirals. If the quantity of sands is too great, the coarse particles decant back, with the final result that a coarse overflow is secured. In this case, by speeding up the classifier, conditions will be restored to normal.

Likewise, if the fineness of the feed changes and the feed becomes finer, the spirals will become filled and the tendency will be to discharge in the oversize all of the oversize and medium fines without decanting back any of the medium fines. Therefore, in order to restore conditions so that the overflow will be returned to the same as the previous operation, it is necessary to slow down the classifier, in order to deliberately decant back some of the medium fines, which will then work back in the settling zone and produce a coarser product.

It should be understood that in many instances it is not a case of operating the classifier at speeds in which a graded product within certain limits is obtained, and also there is a point of economy of operation. Usually, also, within limits, the coarser the overflow, the greater is the capacity of the classifier for any given condition.

Having thus described our invention what we claim and desire to secure by Letters Patent is:

1. A device of the class described comprising a rotary drum having a feed opening at one end and a discharge opening at its opposite end, an inner drum disposed concentrically within the rotary drum, said inner drum having a closed inner end wall and an open end adjacent the feed opening of the rotary drum, means for introducing material into the inner drum, means for delivering material from said inner drum to said rotary drum, and a helical trough of gradually increasing depth winding from the feed end to the discharge end of the rotary drum, the convolutions of the trough being spaced from the inner drum and being disposed closer together at the discharge end than at the feed end of the rotary drum.

2. In a classifier, the combination with a rotary drum having a fed opening at one end through which the fines flow out of the drum and an opening at the opposite end through which the coarser particles are discharged, of means for introducing material into the drum, means for introducing wash water into the drum, and means for causing the material to turn constantly over in the wash water and to move through the drum in the opposite direction to the direction in which the wash water flows through the drum, said last named means comprising a helical trough of gradually increasing depth winding from the feed end of the drum to the coarse particles discharge end of the drum, the convolutions of said trough being spaced closer at the discharge end of the drum than at the feed end of the drum.

3. In a classifier, the combination with a rotary drum having a feed opening at one end and a discharge opening at the opposite end through which the coarse material passes, of means for introducing material into the drum, means for introducing wash water into the drum, and means for causing the material to turn constantly over in the wash water and to move through the drum in the opposite direction to the direction in which the wash water flows through the drum, said last named means comprising a helical trough of gradually increasing depth winding from the feed end of the drum to the discharge end of the drum, the convolutions of the trough being progressively spaced closer together as the depth of the trough increases.

4. A device of the class described comprising a main classifying chamber having a discharge opening at one end, an annular casing for receiving material discharged through said opening, a plurality of buckets disposed within said casing, an open ended cylinder within the main classifying chamber, and means for conveying material draining from said buckets to said cylinder.

5. In a classifier, the combination with a main cylindrical classifying chamber having a discharge opening at one end, of an annular casing for receiving material discharged through the opening, a plurality of buckets disposed within said casing, each of said buckets having a pair of superposed bottom members and an open inner end, one of the bottom members being disposed at an angle to the other bottom member, means for draining liquid from the upper bottom member into the lower member, an open ended cylinder within the main classifying chamber, and a trough leading from the lower bottom member and terminating at said cylinder for carrying liquid towards the main classifying chamber.

6. A device of the class described comprising a rotary drum adapted to classify material mixed with liquid, a casing at one end of the drum for receiving the material classified in the drum, buckets disposed in the casing for picking up the classified material, means for separating the liquid from the material picked up by the buckets, and means leading from the buckets and terminating in the drum for returning the liquid to the drum.

7. In a classifier, the combination with a main drum having a settling chamber and an opening at its rear end through which fines and wash water are discharged, and an opening at its front end through which oversize material is discharged, of an inner drum disposed within the main drum and adapted to receive the material to be classified and discharge the same at a predetermined rate into the settling chamber of the main drum, said inner drum having a closed inner end wall and an open end disposed in spaced relation to the rear end of the main drum, means for supplying wash water to the front end of the main drum, means for conveying material through the drum against the current of wash water comprising a helical trough gradually increasing in depth from the rear end to the front end of the drum, the convolutions of said trough being spaced closer together as their depth increases, said trough being spaced from the exterior of the inner drum, means for rotating the classifier, means associated with the rotating means for changing the speed of rotation, a discharge trough at the front end of the classifier, an annular series of buckets carried by the classifier and rotating therewith for picking up the material at the front end of the classifier and depositing the same in said discharge trough, means for draining surplus water from the material in the buckets, and a trough leading from each bucket for conveying the surplus water to the main drum.

8. In a classifier, the combination with a rotary drum having a feed opening at one end and an oversize material discharge opening at the opposite end, of means for causing the material in the drum to turn constantly over and to move through the drum from the feed end to the oversize material discharge end thereof, said means comprising a helical trough of gradually increasing depth winding from the feed end of the drum to the oversize material discharge end of the drum, the convolutions of said trough being spaced closer at the oversize material discharge end of the drum than at the feed end of the drum.

9. In a classifier, the combination with a rotary drum having a feed opening at one end and a discharge opening for the oversize material at the opposite end, of means for causing the material to turn constantly over in the drum, comprising a helical trough of gradually increasing depth winding from the feed end of the drum to the oversize material discharge end of the drum, the convolutions of the trough being progressively spaced closer together as the depth of the trough increases.

10. In a classifier, the combination with a rotatable drum having a fines material discharge opening at one end and an oversize material discharge opening at the opposite end, of means for moving the material through the drum, comprising a screw flight disposed around the interior of the drum, said screw flight decreasing in pitch and increasing in depth from the fines discharge end toward the oversize discharge end of the drum, the decrease in pitch of said screw flight being at a greater rate than the increase in depth with respect to the volume, whereby the net volume of material carried by the screw flight constantly decreases toward the oversize discharge end of the drum.

11. A classifier comprising a cylinder, and material conveying means within said cylinder comprising a helical band arranged around the inner wall of the cylinder, the height of said band increasing from one end towards the other end of the cylinder, and the convolutions of said helical band varying from one end towards the other end of the cylinder, whereby as the height of the band increases the spaces between the convolutions of the band decrease.

12. A classifier comprising a rotatable drum having an impervious wall and a helical band disposed around the interior of said wall and extending throughout the length of said drum, the height of said band increasing from one end towards the other end of said drum, and the convolutions of said band varying from one end towards the other end of the drum, whereby as the height of the band increases the spaces between the convolutions of the band decrease.

HARLOWE HARDINGE.
ROBERT J. RUSSELL.